US011301007B2

(12) United States Patent
Kinoshita et al.

(10) Patent No.: US 11,301,007 B2
(45) Date of Patent: Apr. 12, 2022

(54) PORTABLE INFORMATION DEVICE

(71) Applicant: LENOVO (SINGAPORE) PTE. LTD., Singapore (SG)

(72) Inventors: Hiroaki Kinoshita, Yokohama (JP); Tatsuya Ushioda, Yokohama (JP); Takehito Yamauchi, Yokohama (JP); Tetsuya Sano, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 34 days.

(21) Appl. No.: 16/930,491

(22) Filed: Jul. 16, 2020

(65) Prior Publication Data

US 2021/0365072 A1 Nov. 25, 2021

(30) Foreign Application Priority Data

May 23, 2020 (JP) .............................. JP2020090148

(51) Int. Cl.
*G06F 1/16* (2006.01)
(52) U.S. Cl.
CPC .......... *G06F 1/1681* (2013.01); *G06F 1/1618* (2013.01); *G06F 1/1641* (2013.01); *G06F 1/1652* (2013.01)
(58) Field of Classification Search
CPC .... G06F 1/1681; G06F 1/1618; G06F 1/1641; G06F 1/1652
See application file for complete search history.

(56) References Cited

U.S. PATENT DOCUMENTS

| 9,506,279 | B2* | 11/2016 | Kauhaniemi | ....... H04M 1/0216 |
| 10,082,827 | B2* | 9/2018 | Yamauchi | ............ G06F 1/1652 |
| 10,558,242 | B2* | 2/2020 | Kim | ..................... G06F 1/1681 |
| 2017/0300089 | A1* | 10/2017 | Hampton | ............. G06F 1/1683 |

FOREIGN PATENT DOCUMENTS

JP 2018112834 A 7/2018

* cited by examiner

*Primary Examiner* — Rockshana D Chowdhury
(74) *Attorney, Agent, or Firm* — Shimokaji IP

(57) ABSTRACT

A portable information device includes: a first chassis; a second chassis adjacent to the first chassis, the second chassis coupled to the first chassis so as to be relatively rotatable between a flat form in which the first and second chassis are arranged side by side in a direction perpendicular to a surface direction thereof and a stacked form in which the first and the second chassis are stacked to overlap each other in the surface direction thereof; a spine member provided across adjacent end portions of the first and second chassis, the spine member covering a gap generated between the adjacent end portions of the first and second chassis in the stacked form; and a cushion portion provided in at least a part of a front side of the spine member, the cushion portion facing an internal space generated between the first and second chassis in the stacked form.

9 Claims, 11 Drawing Sheets

PORTABLE INFORMATION DEVICE

FIELD OF THE INVENTION

The present invention relates to a portable information device in which left and right chassis thereof are rotatably coupled to each other.

BACKGROUND OF THE INVENTION

The Applicant has proposed a portable information device in which left and right chassis thereof are rotatably coupled to each other in Japanese Patent Publication No. 6429909, for example. This portable information device includes a spine member for hiding a gap that appears between the left and right chassis when they are rotated to be folded.

SUMMARY OF THE INVENTION

There are strong demands that such portable information devices should be miniaturized and thinned. In order to meet these demands, electronic components, structural components, and others are densely arranged in the chassis of the portable information devices substantially without clearances thereamong. When a foldable type portable information device such as above is folded, the left and right chassis are rotated. As this happens, relative positions of the chassis are changed, and relative positions of the components with respect to a rotation center are changed as well. In view of this, it is also necessary to prevent that the components in the chassis interfere with each other as well as the components interfere with the spine member to damage the both during the rotation of the chassis.

Referring to the above-mentioned Japanese Patent Publication No. 6429909, for example, the portable information device employs a flexible display extending across the left and right chassis, and a back side thereof is supported by left and right plates. End surfaces of the left and right plates then protrude toward the spine member when the portable information device is folded, which possibly results in that the end surfaces and the spine member interfere with each other and edges of the end surfaces are thus damaged. If the portable information device does not include any such plate, a motherboard or others and the spine member may interfere with each other. Or, if the portable information device includes dual displays, i.e., each of the left and right chassis is provided with a display, end surfaces of the displays may interfere with the spine member.

The present invention has been made in view of the above-described problems with the prior art, and an object thereof is to provide a portable information device which can prevent a failure caused by interferences between the spine member and other components.

A portable information device according to a first aspect of the present invention is a portable information device including: a first chassis; a second chassis provided adjacent to the first chassis, the second chassis being coupled to the first chassis so as to be relatively rotatable between a flat form in which the first and second chassis are arranged side by side in a direction perpendicular to a surface direction thereof and a stacked form in which the first and the second chassis are stacked to overlap each other in the surface direction thereof; a spine member provided across adjacent end portions of the first and second chassis, the spine member covering a gap generated between the adjacent end portions of the first and second chassis in the stacked form; and a cushion portion provided in at least a part of a front side of the spine member, the cushion portion facing an internal space generated between the first and second chassis in the stacked form.

The portable information device may further include a cover member provided to cover the front side of the spine member at least partially. The cushion portion may be provided in a part of the cover member.

On the front side of the spine member, a groove is provided that extends along an arrangement direction of the first and second chassis, the groove serving as a passage for a cable extending across the first and second chassis. The cover member may cover the groove.

The cushion portion of the cover member may include: a front side sheet forming a front side of the cover member; a back side sheet forming a back side of the cover member; a protection sheet laminated on a back side of the front side sheet; a cushion material laminated on a back side of the protection sheet; and a base sheet laminated between a back side of the cushion material and a front side of the back side sheet.

The cushion material may be formed of sponge or rubber, and the cushion material may have a greatest thickness among the front side sheet, the back side sheet, the protection sheet, the base sheet, and the cushion material.

The spine member may be supported to be movable relative to the first chassis along the arrangement direction of the first and second chassis and fixed to be immovable relative to the second chassis. A first end portion on the first chassis side of the cover member may be supported to be moveable relative to the spine member and a second end portion on the second chassis side of the cover member may be fixed to be immovable relative to the spine member. The cover member may include a distal sheet portion in a predetermined area thereof on the first end portion side, the distal sheet portion being made thinner than the cushion portion by omitting the protection sheet and the cushion material. The front side of the spine member may be provided with an opening penetrating in the arrangement direction, the distal sheet portion being slidably inserted into the opening along the arrangement direction.

The cover member may include a transparent portion or a translucent portion at least in a part thereof.

The portable information device may further include: a display extending across the first and second chassis and including a bending region at least in an area across the adjacent end portions; a first plate provided on an inner surface of the first chassis, the first plate supporting an area of the display on the first chassis side; and a second plate provided on an inner surface of the second chassis so as to be adjacent to the first plate, the second plate supporting an area of the display on the second chassis side, wherein the cushion portion is arranged to face end surfaces of the first and second plates in the stacked form.

Each of the first and second plates may be a fiber-reinforced resin plate produced by impregnating reinforced fibers in a matrix resin.

The above aspect of the present invention can prevent a failure caused by interferences between the spine member and other components.

DETAILED DESCRIPTION OF THE INVENTION

In the following, a preferred embodiment of a portable information device according to the present invention will be described in detail with reference to accompanying drawings.

Figure 1:
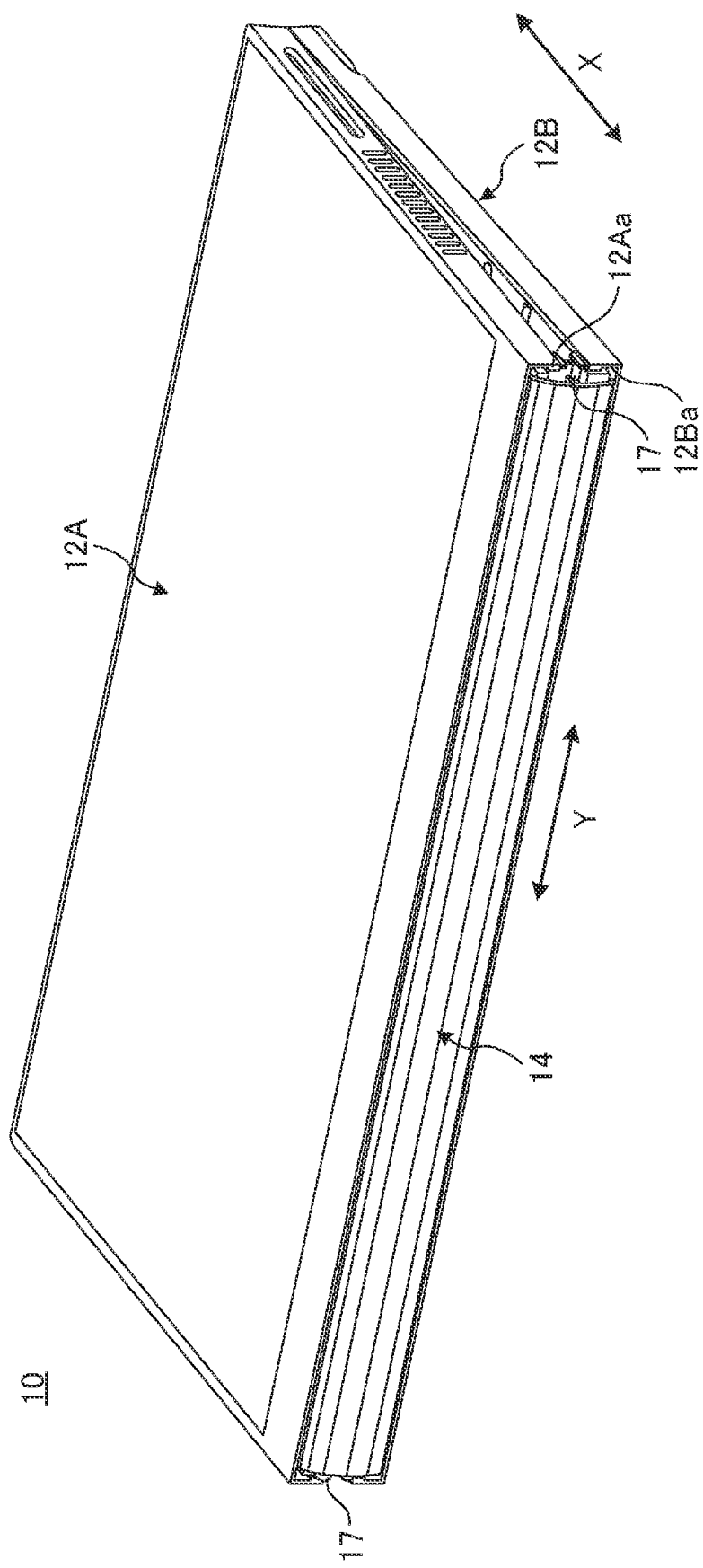
FIG. 1 is a perspective view illustrating a portable information device according to an embodiment that has been closed into a stacked form.
Figure 2:
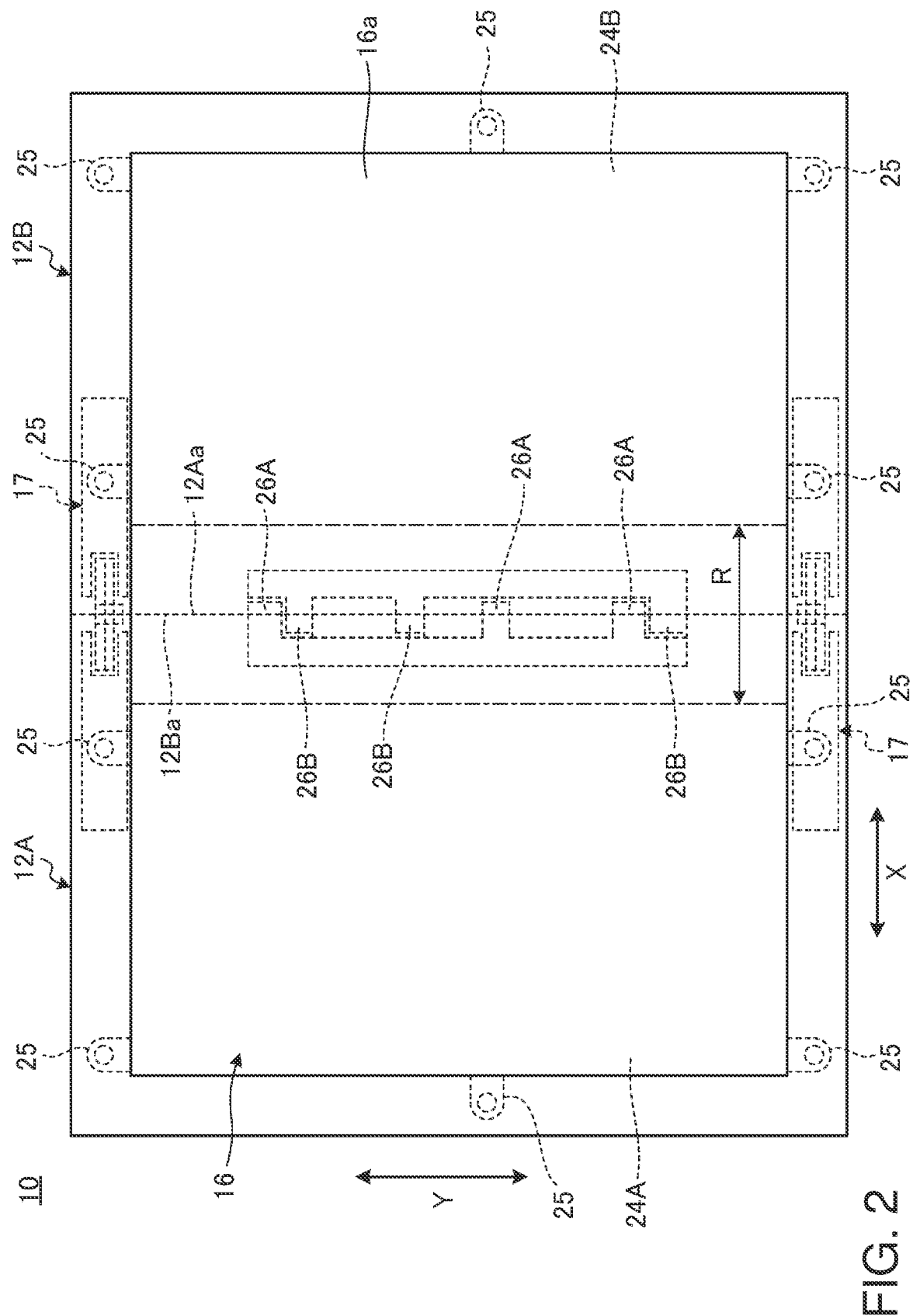
FIG. 2 is a schematic plan view of the portable information device illustrated in FIG. 1 that has been opened into a flat form.
Figure 3:
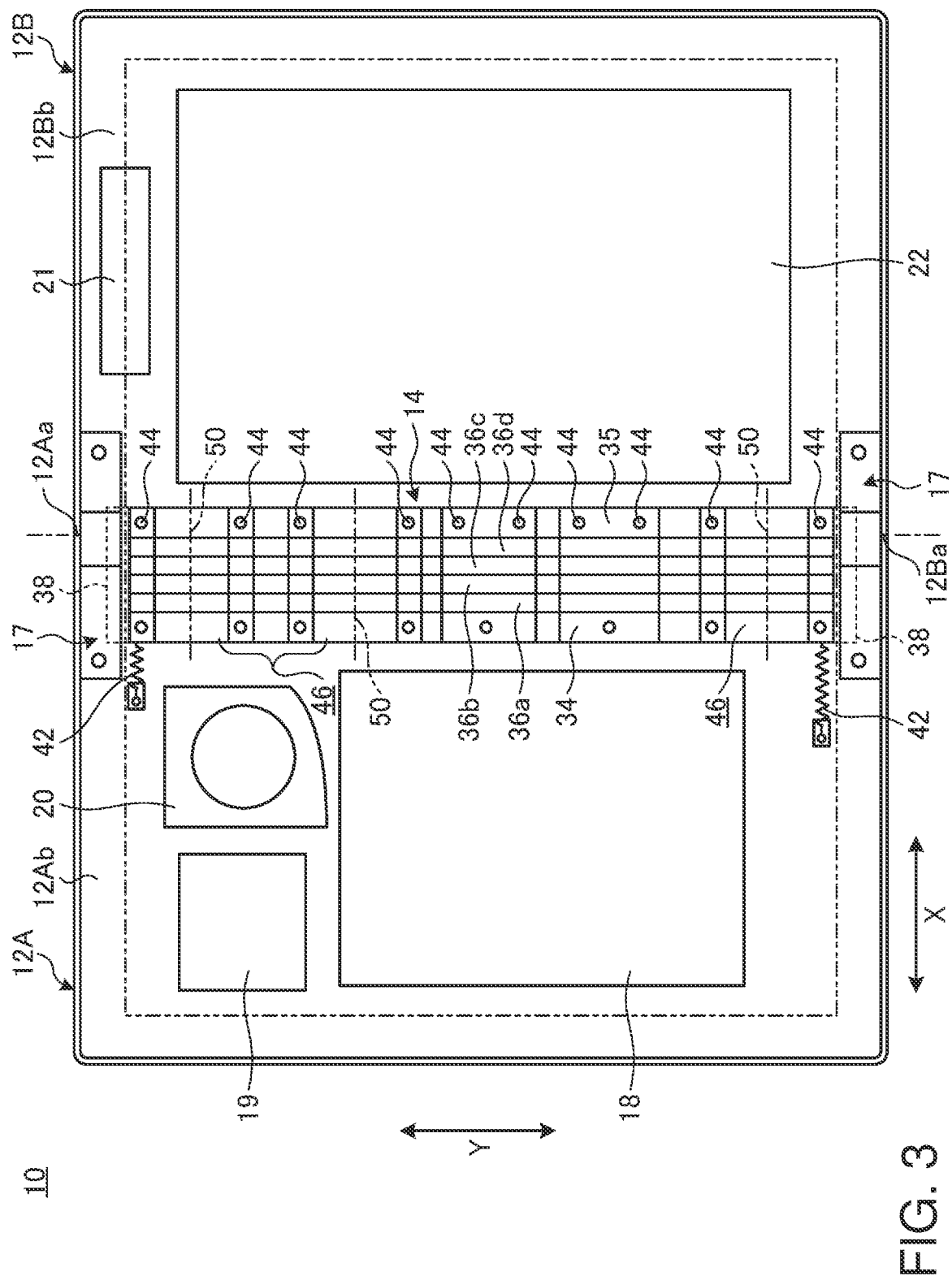
FIG. 3 is a plan view schematically illustrating an internal structure of the portable information device illustrated in FIG. 2.

FIG. 1 is a perspective view illustrating a portable information device 10 according to an embodiment that has been closed into a stacked form. FIG. 2 is a schematic plan view of the portable information device 10 illustrated in FIG. 1 that has been opened into a flat form. FIG. 3 is a plan view schematically illustrating an internal structure of the portable information device 10 illustrated in FIG. 2.

As illustrated in FIGS. 1 to 3, the portable information device 10 includes a first chassis 12A, a second chassis 12B, a spine member 14, and a display 16. The portable information device 10 of this embodiment is a tablet PC that is foldable into a double-folded state like a folio. The portable information device 10 may alternatively be a mobile phone, a smartphone, an electronic notebook, a portable game machine or the like.

The chassis 12A and 12B are disposed adjacently to each other. Each of the chassis 12A and 12B is formed of a rectangular plate member having a side wall that is erected from three sides thereof except for a side corresponding to the spine member 14 (adjacent end portions 12Aa or 12Ba), for example. Each of the chassis 12A and 12B is formed of a metal plate of stainless steel, magnesium, aluminum or the like or a fiber-reinforced resin plate containing reinforced fibers such as carbon fibers.

In the following description of the portable information device 10, as illustrated in FIGS. 1 to 3, a direction in which the chassis 12A and 12b are arranged side by side, i.e., a transverse direction (width direction) of the spine member 14 is referred to as an X direction, and a direction that is orthogonal to the X direction and extends along the adjacent end portions 12Aa and 12Ba, i.e., a longitudinal direction of the spine member 14 is referred to as a Y direction.

The chassis 12A and 12B are coupled to each other by a pair of hinges 17 at the adjacent end portions 12Aa and 12Ba. The hinges 17 allow the chassis 12A and 12B to be relatively rotated between a stacked form illustrated in FIG. 1 and a flat form illustrated in FIG. 2. The hinges 17 are respectively disposed at both ends in the Y direction of the adjacent end portions 12Aa and 12Ba of the chassis 12A and 12B and are thus located outside the outer peripheral edge portion of the display 16. In the portable information device 10 of this embodiment, a rotation center of the chassis 12A and 12B defined by the hinges 17 coincides with a front side 16a of the display 16.

Figure 4A:
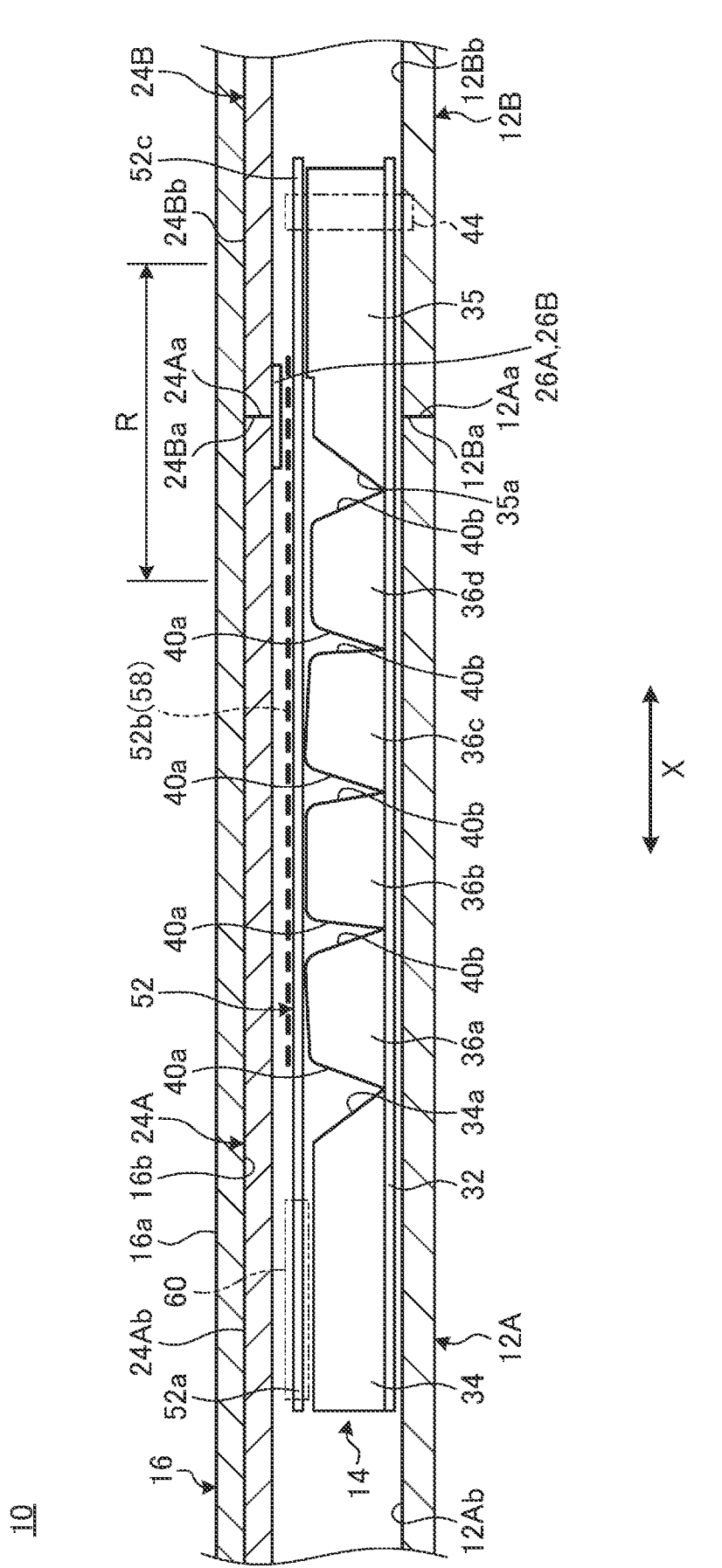
FIG. 4A is a side cross-sectional view schematically illustrating an internal structure of the portable information device in the flat form.

In the flat form, the chassis 12A and 12B are arranged side by side in the X direction perpendicular to a surface direction thereof and the adjacent end portions 12Aa and 12Ba are in contact with each other (see FIGS. 2 and 4A). In the stacked form, the chassis 12A and 12B are stacked to overlap each other in the surface direction thereof and the adjacent end portions 12Aa and 12Ba are separated to form a big gap therebetween (see FIG. 4B).

As illustrated in FIG. 3, a motherboard 18, a communication module 19, a cooling fan 20, and others are fixed to an inner surface 12Ab of the first chassis 12A using a screw or the like. An antenna 21, a battery unit 22, and others are fixed to an inner surface 12Bb of the second chassis 12B using a screw or the like. The motherboard 18 is an electronic substrate for controlling the portable information device 10 in general, and unillustrated various electronic components such as a central processing unit (CPU) and a memory are mounted thereon. The communication module 19 is a device which processes information transmitted and received by an antenna 21 via various wireless communications such as wireless local area network (WLAN) or wireless wide area network (WWAN). The antenna 21 is usually provided in plurality. The cooling fan 20 is a device for cooling the CPU and others mounted on the motherboard 18. The battery unit 22 is a power supply for the portable information device 10 and can be charged from an external power source via an unillustrated power cable. Electronic components other than the above may be mounted in the chassis 12A and 12B.

Figure 4B:
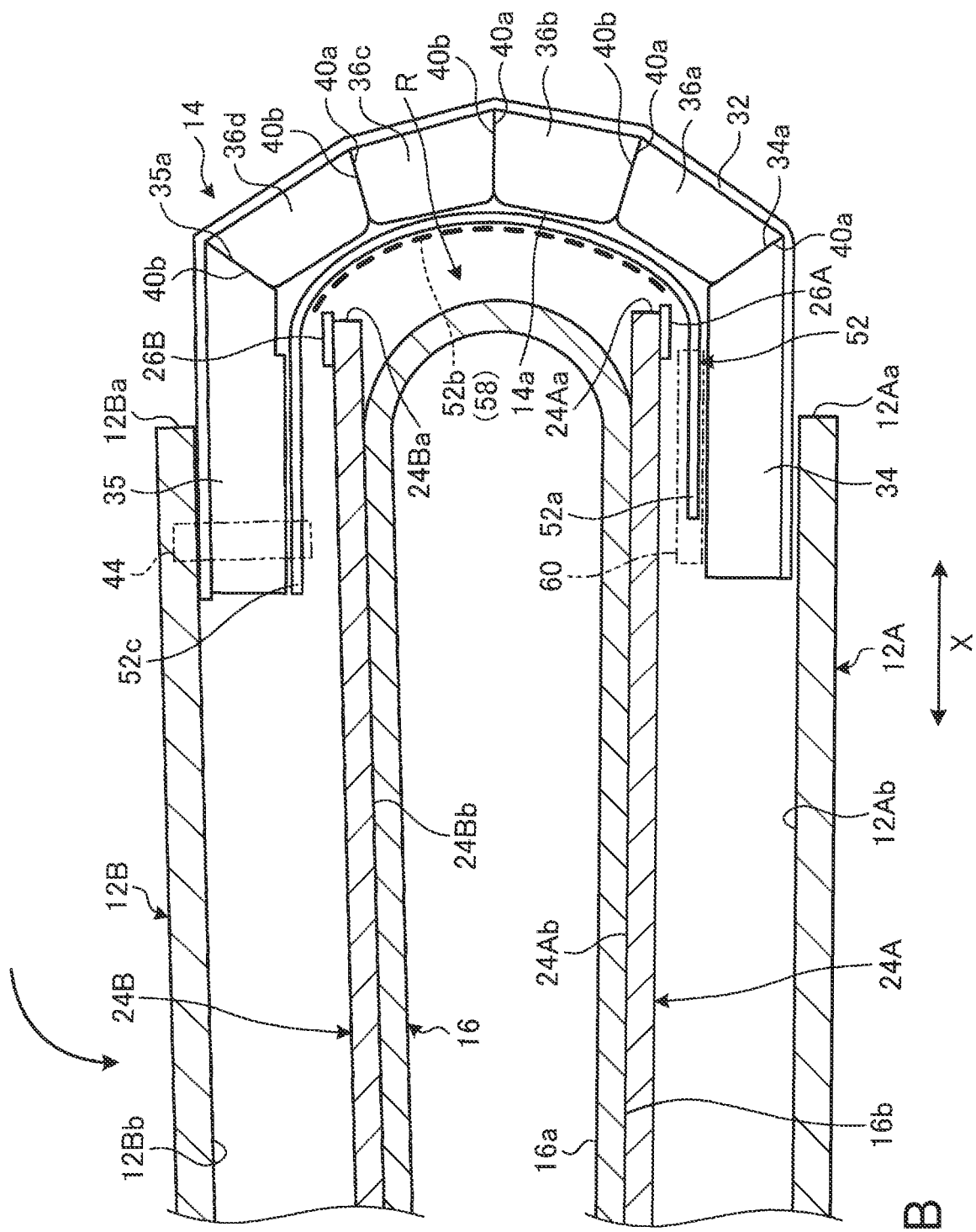
FIG. 4B is a side cross-sectional view of the portable information device illustrated in FIG. 4A in the stacked form.

FIG. 4A is a side cross-sectional view schematically illustrating an internal structure of the portable information device 10 in the flat form. FIG. 4B is a side cross-sectional view of the portable information device 10 illustrated in FIG. 4A in the stacked form. FIGS. 4A and 4B illustrate, in an enlarged manner, the adjacent end portions 12Aa and 12Ba of the left and right chassis 12A and 12B as well as the periphery thereof.

As illustrated in FIGS. 3 to 4B, the display 16 extends across the chassis 12A and 12B. The display 16 is a touch panel type liquid crystal display, for example. The display 16 is a flexible display such as an organic EL having a paper structure with high flexibility. As illustrated in FIGS. 4A and 4B, the display 16 is supported by a first plate 24A and a second plate 24B and extends across these plates 24A and 24B.

The first plate 24A is disposed to cover a top opening of the first chassis 12A. The second plate 24B is disposed to cover a top opening of the second chassis 12B. The plates 24A and 24B are arranged adjacent to each other. The plates 24A and 24B support the display 16 on front sides 24Ab and 24Bb thereof. A back side 16b of the display 16 is stuck onto the front sides 24Ab and 24Bb of the plates 24A and 24B using an adhesive such as a double-sided tape. Each of the plates 24A and 24B is a thin and hard plate-like member. Each of the plates 24A and 24B of this embodiment is a fiber-reinforced resin plate produced by impregnating reinforced fibers such as carbon fibers in a matrix resin such as an epoxy resin. Each of the plates 24A and 24B may be a metal plate of stainless steel or the like.

Each of the plates 24A and 24B is provided with a plurality of attachment pieces 25 that are projected from three outer peripheral end surfaces other than the adjacent end surfaces 24Aa and 24Ba (see FIG. 2). The attachment pieces 25 are respectively screwed to boss portions (not illustrated) erecting from the inner surfaces of the chassis 12A and 12B, for example. The display 16 is relatively fixed to the chassis 12A and 12B via the plates 24A and 24B. This causes the plates 24A and 24B to be rotated integrally with the chassis 12A and 12B, which results in bending the display 16. The plates 24A and 24B may be fixed to the chassis by screwing back sides thereof directly to the boss portion or the like instead of screwing a part or all of the attachment pieces 25.

In the flat form illustrated in FIG. 4A, the plates 24A and 24B are arranged adjacent to each other in a direction perpendicular to the surface direction thereof so that the adjacent end surfaces 24Aa and 24Ba are in contact with each other. Here, the display 16 serves as a large screen opened into a flat shape. In the stacked form illustrated in FIG. 4B, the adjacent end surfaces 24Aa and 24Ba of the plates 24A and 24B are separated from each other. Here, the display 16 is folded into a substantial U-shape.

As illustrated in FIGS. 2, 4A, and 4B, the display 16 includes a bending region R in an area across the adjacent end surfaces 24Aa and 24Ba of the plates 24A and 24B. The bending region R, which is a belt-like region that is shorter in the X direction and longer in the Y direction, is provided to bridge the adjacent end portions 12Aa and 12Ba of the chassis 12A and 12B. It is the bending region R that is bent when the chassis 12A and 12B change from the flat form into the stacked form. The display 16 may be flexible only in the bending region R.

An area of the back side 16b of the display 16 other than the bending region R is fixed to the front side 24Ab of the first plate 24A. An area of the back side 16b of the display 16 other than the bending region R is fixed to the front side 24Bb of the second plate 24B. For the fixation of the back side 16b of the display 16 to the front sides 24Ab and 24Bb, an adhesive such as a double-sided tape is used, for example. The bending region R, which is not fixed to the plates 24A and 24B, is movable relative to the front sides 24Ab and 24Bb.

Each of the plates 24A and 24B is provided with a locking claw 26A and 26B on the back sides thereof. The locking claw 26A provided on the back side of the first plate 24A protrudes beyond the adjacent end surfaces 24Aa and 24Ba to contact the back side of the second plate 24B. The locking claw 26B provided on the back side of the second plate 24B protrudes beyond the adjacent end surfaces 24Ba and 24Aa to contact the back side of the first plate 24A. There may be one locking claw 26A and one locking claw 26B. In this embodiment, the locking claws 26A and 26B are provided in plurality (three) each and arranged in parallel (see FIG. 2). For example, the three locking claws 26A and 26B each are aligned along a side of a plate. In the flat form illustrated in FIG. 4A, upper surfaces of tips of locking claws 26A and 26B are respectively in contact with the back sides of the plates 24B and 24A to suppress a level difference between the plates 24A and 24B. This allows an extremely flat plane to be formed and maintained by the front sides 24Ab and 24Bb of the plates 24A and 24B. The locking claws 26A and 26B may be omitted.

Figure 5:
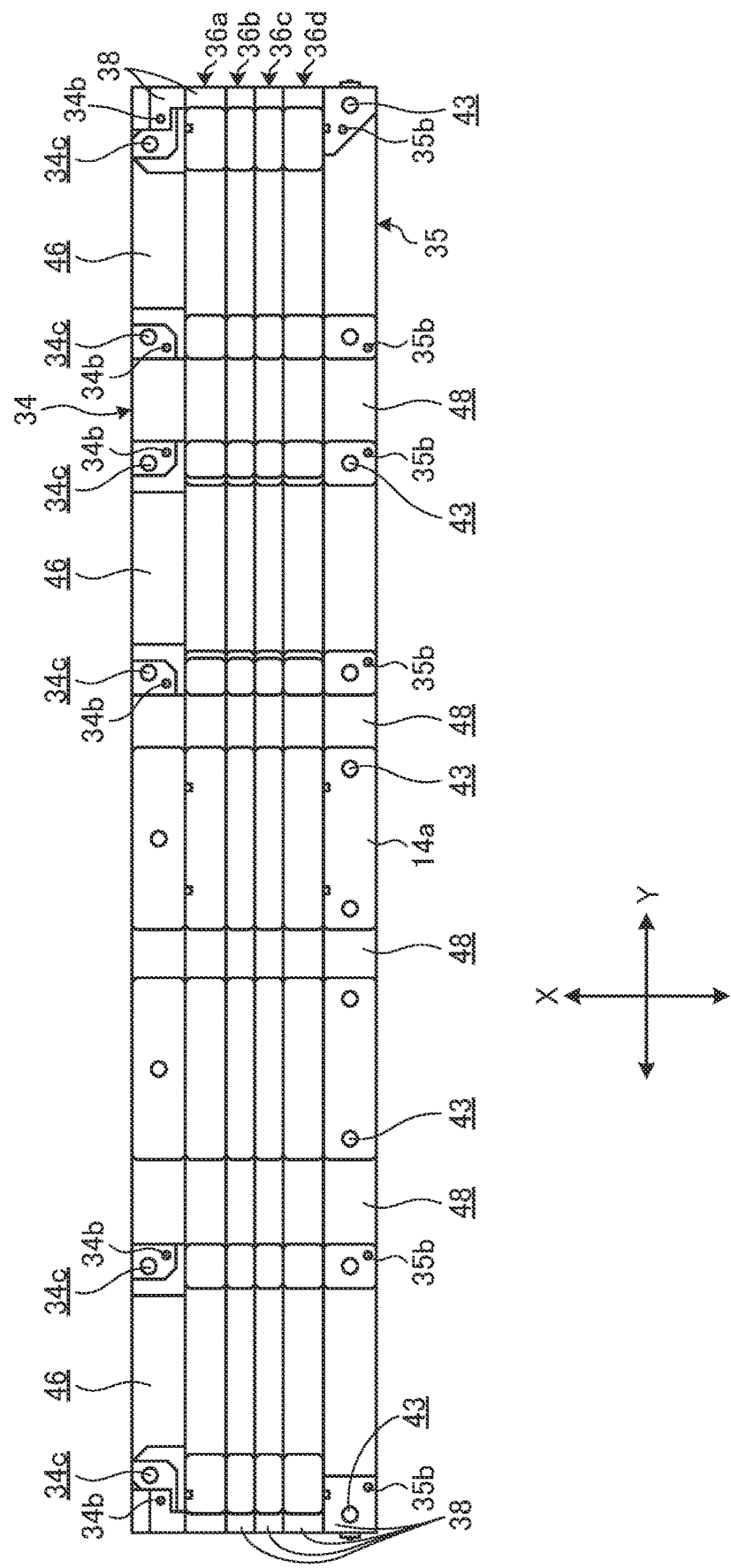
FIG. 5 is a plan view of a spine member.
Figure 6:
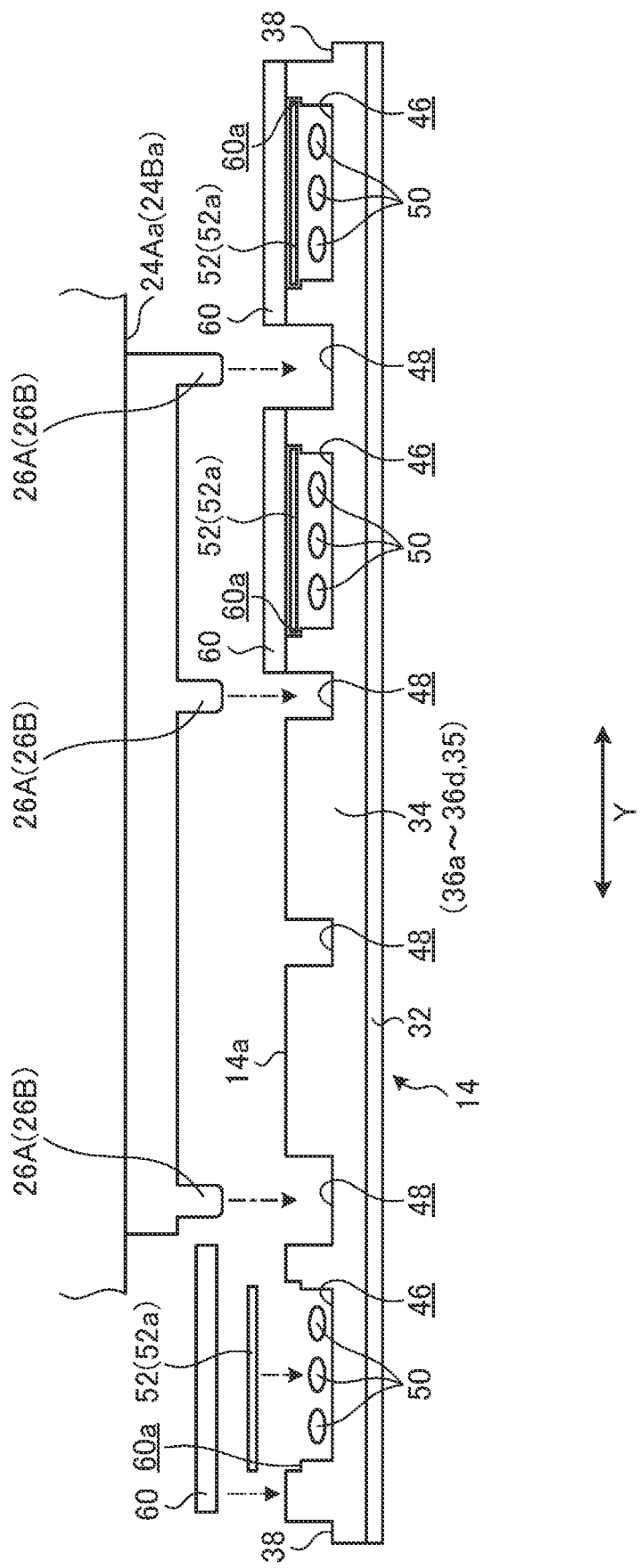
FIG. 6 is a schematic side view of the spine member.
Figure 7A:
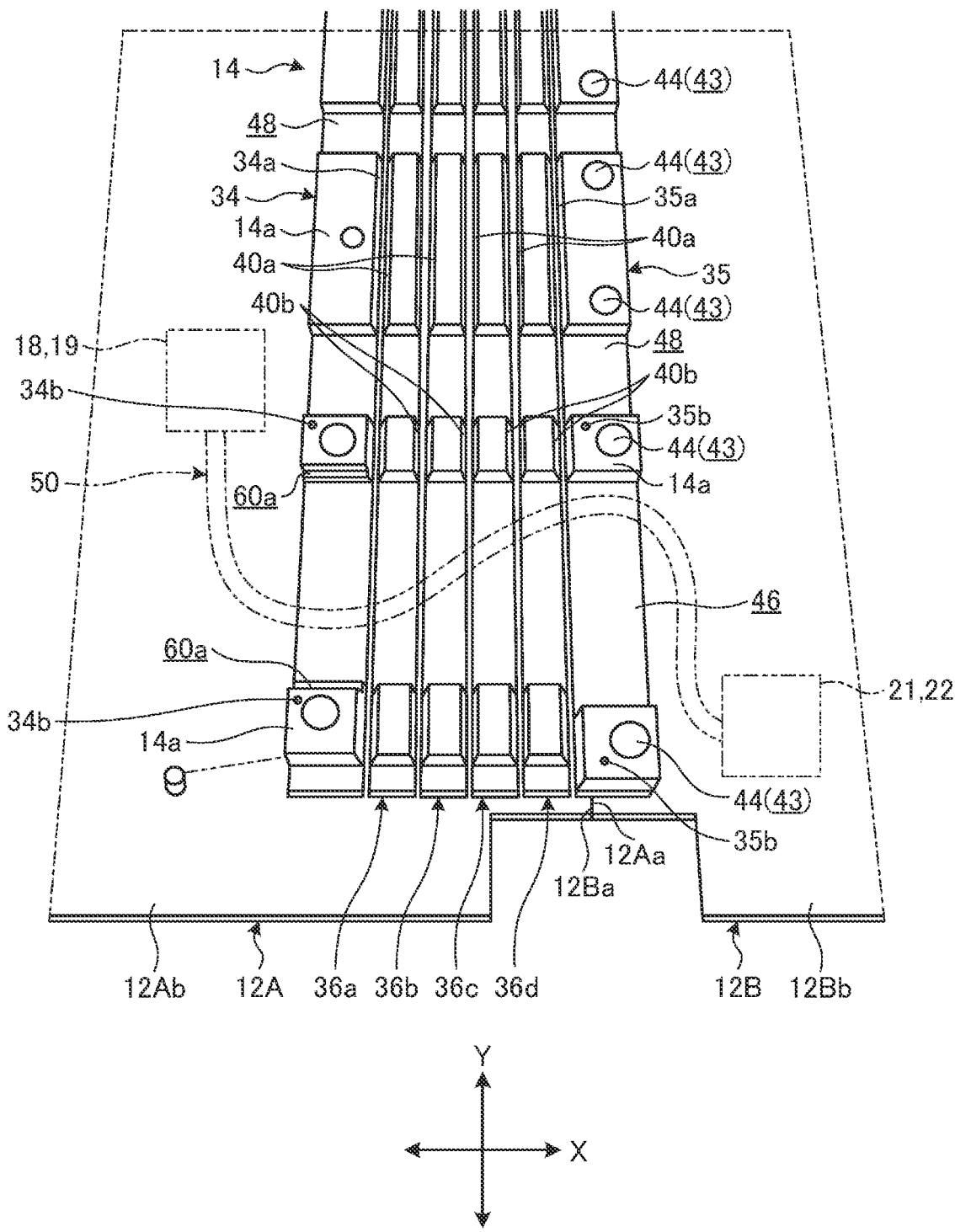
FIG. 7A is an enlarged perspective view schematically illustrating a part of the spine member.

The spine member 14 and components related thereto are now described. FIG. 5 is a plan view of a spine member 14. FIG. 6 is a schematic side view of the spine member 14. In FIG. 6, some of a plurality of cover members 52 described below are illustrated as attached and some as exploded. FIG. 7A is an enlarged perspective view schematically illustrating a part of the spine member 14.

As illustrated in FIGS. 4A and 4B, the spine member 14 covers a gap between the adjacent end portions 12Aa and 12Ba that is generated when the chassis 12A and 12B change from the flat form into the stacked form. The spine member 14 thus prevents components such as the display 16, the plates 24A and 24B, the motherboard 18, and the battery unit 22 housed in the chassis 12A and 12B from being exposed to an outside in the stacked form. The spine member 14 is a thin plate member that is flexible in the X direction. The spine member 14 is provided across the inner surfaces 12Ab and 12Bb of the chassis 12A and 12B to bridge and cover the adjacent end portions 12Aa and 12Ba from an inside.

As illustrated in FIGS. 4A, 5, and 7A, the spine member 14 includes a sheet member 32, a distal post member 34, a proximal post member 35, and a plurality of post members 36a, 36b, 36c, and 36d.

The sheet member 32 is a flexible, high-strength sheet and has such a width dimension in the X direction that, in the stacked form, it can cover the gap between the adjacent end portions 12Aa and 12Ba of the chassis 12A and 12B (see FIG. 4B). The sheet member 32 is a triaxial woven fabric made of carbon fibers, glass fibers, polyethylene terephthalate (PET) fibers or the like that have been triaxially woven together, for example. In particular, such a triaxial woven fabric is impregnated in a matrix resin to produce a triaxial woven prepreg. The sheet member 32 may alternatively be another fabric such as a biaxial fabric, a resin sheet, a metal sheet, or the like.

Each of the post members 34, 35, and 36a to 36d is a thin and narrow strip-like plate formed of a resin, metal, or the like. In this embodiment, the distal post member 34 and the proximal post member 35 are wider in the X direction than the post members 36a to 36d therebetween. The post members 34, 35, and 36a to 36d may all have same or different width dimensions in the X direction as appropriate. In the spine member 14, the distal post member 34, the post members 36a to 36d, and the proximal post member 35 are arranged side by side in this order from the first chassis 12A toward the second chassis 12B.

The post members 34, 35, and 36a to 36d are adhered to be fixed to a front side of the sheet member 32 using a gluing agent or an adhesive such as a double-sided tape. As the chassis 12A and 12B are rotated, the spine member 14 is bent from a flat shape to a substantial U-shape. The post members 34, 35, and 36a to 36d and the sheet member 32 may be integrally molded by a resin. Thin plate portions 38 are provided at longitudinal end portions of the post members 34, 35, and 36a to 36d. The thin plate portions 38 are slidably held on a bottom surface side of the hinges 17 (see FIG. 3).

The distal post member 34 has a trapezoidal cross section, and a leg thereof on the first chassis 12A side is orthogonal to upper and lower bases thereof. The distal post member 34 is placed on the inner surface 12Ab of the first chassis 12A and is slidable in the X direction relative to the inner surface 12Ab. A side surface 34a of the distal post member 34 on the second chassis 12B side faces a side surface 40a of the adjacent post member 36a. The side surface 34a is an inclined surface inclined in a direction from the second chassis 12B toward the first chassis 12A as it goes from a back side (a surface on the sheet member 32 side) toward a front side (a surface on the first plate 24A side) of the spine member 14 (see FIG. 4A). In other words, the side surface 34a is inclined in a direction away from the post member 36a as it goes upward.

The distal post member 34 is biased by a spring 42 in the X direction (see FIG. 3). The spring 42 continuously biases the spine member 14 in the X direction toward the first chassis 12A side via the distal post member 34.

The proximal post member 35 has a trapezoidal cross section, and a leg thereof on the second chassis 12B side is orthogonal to upper and lower bases thereof. The proximal post member 35 is placed on the inner surface 12Bb of the second chassis 12B and is fixed to be immovable relative to the inner surface 12Bb. The proximal post member 35 is provided with an attachment hole 43 penetrating in a thickness direction at an appropriate longitudinal location (see FIG. 5). A screw 44 is inserted through the attachment hole 43. The screw 44 is screwed through the attachment hole 43 into an unillustrated female threaded portion provided on the inner surface 12Bb of the second chassis 12B. The proximal post member 35, i.e., the spine member 14 is thus fixed to the second chassis 12B. A side surface 35a of the proximal post member 35 on the first chassis 12A side faces a side surface 40b of the adjacent post member 36d. The side surface 35a is an inclined surface inclined in a direction from the first chassis 12A toward the second chassis 12B as it goes from the back side toward the front side of the spine member 14 (see FIG. 4A). In other words, the side surface 35a is inclined in a direction away from the post member 36d as it goes upward.

Each of the post members 36a to 36d has a trapezoidal cross section. The post members 36a to 36d are placed on the inner surface 12Ab of the first chassis 12A and are slidable in the X direction relative to the inner surface 12Ab. Each of the post members 36a to 36d has a side surface 40a on the first chassis 12A side and a side surface 40b on the second chassis 12B side. The side surface 40a is an inclined surface inclined in a direction from the first chassis 12A toward the second chassis 12B as it goes from the back side toward the front side of the spine member 14. The side surface 40b is an inclined surface inclined in a direction from the second chassis 12B toward the first chassis 12A as it goes from the back side toward the front side of the spine member 14. Among the four post members 36a to 36d, the outermost post members 36a and 36d are shaped symmetrically to each other and the intermediate post members 36b and 36c are shaped symmetrically to each other. The number of the post members 36a to 36d to be provided can be changed as appropriate.

Thus, in the spine member 14, the proximal post member 35 is fixed to the second chassis 12B, and the distal post member 34 and the post members 36a to 36d are supported to be movable in the X direction relative to the first chassis 12A. Alternatively, the proximal post member 35 may be fixed to the first chassis 12A and the distal post member 34 may be arranged on the second chassis 12B side.

As illustrated in FIGS. 5 to 7A, a plurality of grooves 46 and a plurality of relief grooves 48 are provided on the front side 14a of the spine member 14.

Three grooves 46 are provided in a longitudinal direction of the spine member 14, for example. Each groove 46 is formed by partially recessing the front side 14a of the spine member 14 and extends along the X direction like a canal. In other words, each groove 46 is formed by recessing a part of each post member 34, 35, and 36a to 36d at same locations in the Y direction on the front side 14a so that the grooves together form a continuous groove shape in the X direction.

Each groove 46 serves as a passage for a cable 50 extending across the left and right chassis 12A and 12B (see FIGS. 3, 6, and 7A). Passing through the groove 46 prevents the cable 50 from being displaced or lifted on the front side 14a during the rotation of the chassis 12A and 12B. Accordingly, the cable 50 will not be caught between other components or subjected to such an excessive force that causes a connection terminal thereof to come off during the rotation of the chassis 12A and 12B.

Four relief grooves 48 are provided in a longitudinal direction of the spine member 14, for example. Each relief groove 48 is formed in the same manner as the groove 46 but has a smaller width dimension in the Y direction than that of the groove 46. The relief grooves 48 serve as escape spaces so that the locking claws 26A and 26B protruding beyond the adjacent end surfaces 24Aa and 24Ba of the plates 24A and 24B do not interfere with the front side 14a during the rotation of the chassis 12A and 12B.

As illustrated in FIG. 6, cover members 52 that cover the grooves 46 are attached to the front side 14a of the spine member 14. Note that the cover members 52 are detached in FIGS. 3, 5, and 7A.

Figure 7B:
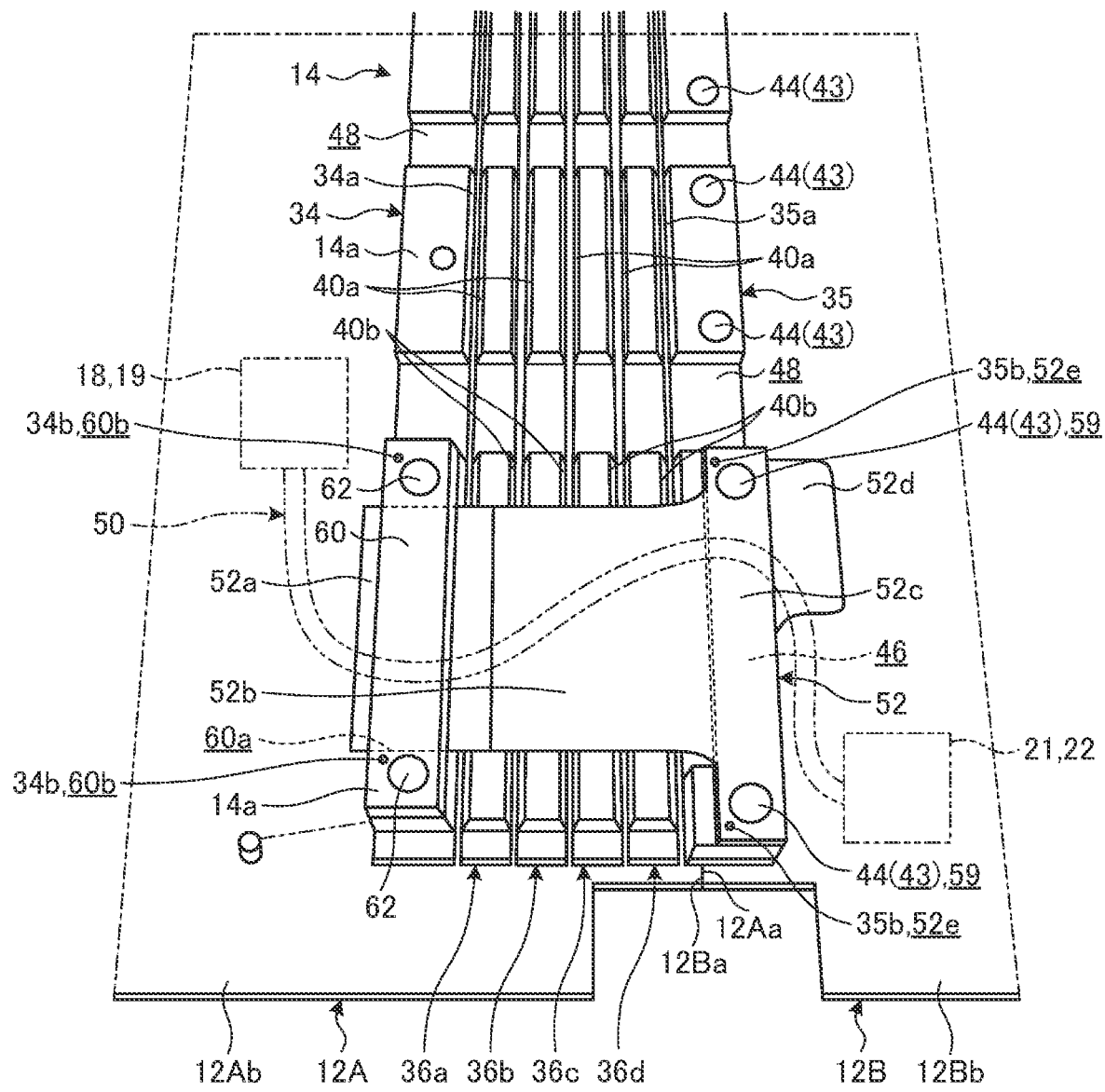
FIG. 7B is a perspective view illustrating that a cover member is attached to the spine member illustrated in FIG. 7A.
Figure 8A:
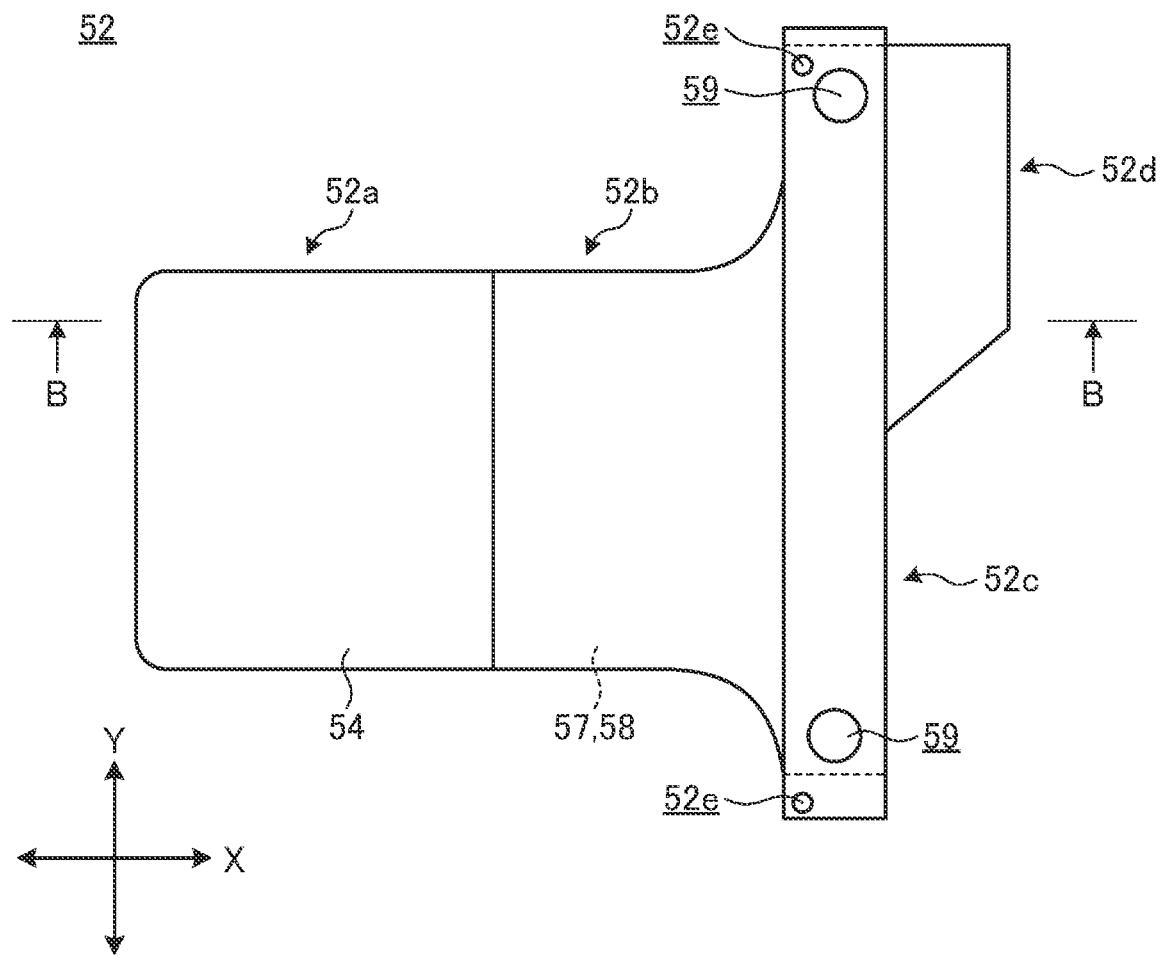
FIG. 8A is a schematic plan view of the cover member.
Figure 8B:
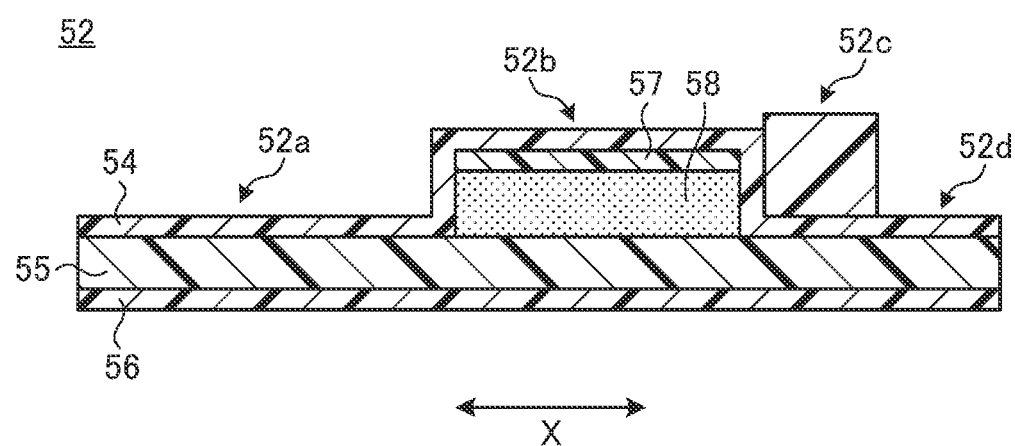
FIG. 8B is a schematic cross-sectional view along a line B-B in FIG. 8A.

FIG. 7B is a perspective view illustrating that the cover member 52 is attached to the spine member 14 illustrated in FIG. 7A. FIG. 8A is a schematic plan view of the cover member 52. FIG. 8B is a schematic cross-sectional view along a line B-B in FIG. 8A.

As illustrated in FIGS. 6 to 7B, the cover member 52 serves as a cap that covers the groove 46 to prevent the cable 50 from lifting and coming off. The cover member 52 also serves as a protection member that protects components (in this embodiment, the plates 24A and 24B) in the chassis 12A and 12B from contact with the spine member 14. The cover member 52 extends over the entire X-direction length of the groove 46 and thus covers the groove 46. The cover member 52 may extend over the entire Y-direction length of the spine member 14.

As illustrated in FIGS. 7B to 8B, the cover member 52 includes a distal sheet portion 52a, a cushion portion 52b, an attachment portion 52c and an auxiliary cover portion 52d.

The distal sheet portion 52a is a laminated sheet thinner than the cushion portion 52b. The distal sheet portion 52a occupies a predetermined area of the cover member on the first chassis 12A side including a first end portion. The distal sheet portion 52a is a three-layer structure formed by laminating a front side sheet 54, a base sheet 55, and a back side sheet 56 in this order from a front side (the plates 24A and 24B side) to a back side (the spine member 14 side) of the cover member 52 (see FIG. 8B).

As illustrated in FIG. 8B, the front side sheet 54 extends across the entire X-direction length of the cover member 52 and forms a front side thereof. In the distal sheet portion 52a, the front side sheet 54 is adhered to be fixed to a front side of the base sheet 55 using a gluing agent or an adhesive. The front side sheet 54 is a flexible thin sheet formed of polytetrafluoroethylene (PTFE), for example. A thickness of the front side sheet 54 is about 0.08 mm, for example. The front side sheet 54 is preferably formed of a resin with self-lubricity such as PTFE so that friction and wear can be reduced when the distal sheet portion is slid into an opening 60a as will be described later. The front side sheet 54 may be formed of a resin other than PTFE such as a nylon-based resin or the like. The front side sheet 54 is preferably transparent or translucent.

The base sheet 55 extends over the entire X-direction length of the cover member 52 and serves as a base thereof. In the distal sheet portion 52a, the base sheet 55 is laminated between the front side sheet 54 and the back side sheet 56 and is adhered to be fixed to the sheets 54 and 56 using a gluing agent or an adhesive. The base sheet 55 is a flexible thin sheet formed of PET, for example. A thickness of the base sheet 55 is about 0.2 mm, for example, which is greater than that of the front side sheet 54. The base sheet 55 may be formed of a nylon-based resin or the like or a thin metal film such as stainless steel. The base sheet 55 is preferably transparent or translucent.

The back side sheet 56 extends over the entire X-direction length of the cover member 52 and forms a back side thereof. The back side sheet 56 is laminated on a back side of the base sheet 55 and is adhered to be fixed to the base sheet 55 using a gluing agent or an adhesive. The back side sheet 56 may be formed of the same material as the front side sheet 54 (PTFE, for example) and may have the same thickness (0.08 mm, for example). The back side sheet 56 may be formed of a different material and may have a different thickness from the front side sheet 54. The back side sheet 56 is preferably transparent or translucent.

The cushion portion 52b is a laminated sheet thicker than the distal sheet portion 52a and the auxiliary cover portion 52d. The cushion portion 52b is provided between the distal sheet portion 52a and the attachment portion 52c in the X direction and overlaps at least partially with the front side 14a of the post members 36b to 36d. In the stacked form, the cushion portion 52b faces an internal space between the chassis 12A and 12B, i.e., the bending region R of the display 16 and the plates 24A and 24B (see FIG. 4B).

As illustrated in FIG. 8B, the cushion portion 52b is of a five-layer structure formed by laminating the front side sheet 54, a protection sheet 57, a cushion material 58, the base sheet 55 and the back side sheet 56 in this order from the front side to the back side of the cover member 52. The front side sheet 54, the base sheet 55 and the back side sheet 56 of the cushion portion 52b are common with those of the distal sheet portion 52a.

The protection sheet 57 extends over the entire X-direction length of the cushion portion 52b. More specifically, the protection sheet 57 is provided to cover only a front side of the cushion material 58. The protection sheet 57 is laminated between the front side sheet 54 and the cushion material 58 and is adhered to be fixed to a back side of the front side sheet 54 and a front side of the cushion material 58 using a gluing agent or an adhesive. The protection sheet 57 is a flexible thin sheet formed of PET, for example. A thickness of the protection sheet 57 is smaller than that of the front side sheet 54 or the base sheet 55 and is about 0.05 mm, for example. As long as the protection sheet 57 can protect the front side of the cushion material 58, it may be formed of a resin other than PET, a metal foil, or others.

The cushion material 58 is laminated between the protection sheet 57 and the base sheet 55 and is adhered to be fixed to a back side of the protection sheet 57 and a front side of the base sheet 55 using a gluing agent or an adhesive. The cushion material 58 is a flexible spongy sheet formed of a polyurethane resin, for example. Among the five layers of the cushion portion 52b, a thickness of the cushion material 58 is the greatest and is 0.25 mm, for example. This allows the cushion material 58 to exhibit high shock absorbing performance. The cushion material 58, on the front side of which the protection sheet 57 has been stuck in advance, is disposed between the base sheet 55 and the front side sheet 54. The cushion material 58 may be of a material and/or structure having certain cushioning property. For example, it may be formed of a spongy resin material other than polyurethane or flexible rubber.

The attachment portion 52c attaches the cover member 52 to the spine member 14. The attachment portion 52c is formed of a hard resin and has a rectangular sectional shape. The attachment portion 52c extends over the entire Y-direction width of the cover member 52, and an X-direction length dimension of the attachment portion is somewhat smaller than or equal to the width dimension of the proximal post member 35. The attachment portion 52c is disposed next to the cushion portion 52b and is fixed to a front side of the front side sheet 54 using a double-sided tape or a gluing agent.

The attachment portion 52c is provided with attachment holes 59 formed through respective longitudinal (Y-direction) end portions thereof. A screw 44 is inserted into each attachment hole 59 to fix the spine member 14 to the second chassis 12B. The cover member 52 is then co-fastened to the second chassis 12B together with the spine member 14. The cover member 52 may alternatively be fixed only to the spine member 14 using a screw, a gluing agent, or others. The attachment portion 52c may be omitted. In that case, a part of the cushion portion 52b or the auxiliary cover portion 52d may be adhered to be fixed to the front side 14a of the spine member 14 using a gluing agent, a double-sided tape or the like. The attachment portion 52c may also be provided with the front side sheet 54. The attachment portion 52c may not be provided with the base sheet 55 and the back side sheet 56.

The auxiliary cover portion 52d is arranged at a location off the groove 46 when seen in plan view. The auxiliary cover portion 52d prevents the cable 50 drawn out of the groove 46 (to the second chassis 12B side) from lifting. The auxiliary cover portion 52d is a piece of thin sheet extending farther to the second chassis 12B side than the attachment portion 52c.

As illustrated in FIG. 8B, the auxiliary cover portion 52d is of a three-layer structure formed by laminating the front side sheet 54, the base sheet 55 and the back side sheet 56. The auxiliary cover portion 52d is of the same structure and thickness as the distal sheet portion 52a. The auxiliary cover portion 52d may omit the front side sheet 54, for example. The auxiliary cover portion 52d protrudes from an X-direction end side of the attachment portion 52c to the second chassis 12B side and has a substantially trapezoidal shape in plan view. The auxiliary cover portion 52d may have a rectangular shape in plan view or may protrude from an entire Y-direction length of the attachment portion 52c to the second chassis 12B side. The auxiliary cover portion 52d may be omitted.

An attachment of the cover member 52 to the spine member 14 is now described.

As illustrated in FIGS. 6 and 7B, the cover member 52 is disposed to cover the groove 46 as a whole, and the attachment portion 52c is arranged on the front side 14a of the proximal post member 35. The cover member 52 is fixed to the second chassis 12B together with the spine member 14 by tightening the screws 44 through the attachment holes 59 and 43.

The distal sheet portion 52a is placed on a bottom surface of a step 60a which is lower than the front side 14a of the walls on both sides in the Y direction of the groove 46 in the distal post member 34 (see FIG. 6). A retaining member 60 spanning above the distal sheet portion 52a is disposed on the front side 14a of the distal post member 34. The retaining member 60 is fixed by inserting a screw 62 (see FIG. 7B) into a screw hole 34c provided on the front side 14a of the distal post member 34 (see FIG. 5).

As illustrated in FIG. 6, a gap for a height of the step 60a is generated between the retaining member 60 and the bottom surface of the step 60a (note that this gap is denoted with the same symbol as the step 60a and is called an "opening 60a"). Into the opening 60a, the distal sheet portion 52a is inserted in a slidable manner in the X direction. It is thus preferable that the distal sheet portion 52a is as thin as possible. As such, the distal sheet portion 52a of the cover member 52 of this embodiment is not provided with the cushion material 58 and the protection sheet 57. For the sake of manufacturing efficiency, however, the distal sheet portion 52a may be of the same structure as the cushion portion 52b. An external surface of the distal sheet portion 52a is constituted by the front side sheet 54 and the back side sheet 56 formed of PTFE, which allows a smooth sliding of the distal sheet portion 52a into the opening 60a.

Thus, the attachment portion 52c (and the auxiliary cover portion 52d) of the cover member 52 on the second chassis 12B side is fixed to be immovable relative to the spine member 14, while the distal sheet portion 52a and the cushion portion 52b on the first chassis 12A side are supported to be movable relative to the spine member 14. It is alternatively possible to arrange the attachment portion 52c of the cover member 52 on the first chassis 12A side and the distal sheet portion 52a on the second chassis 12B side, of course.

The cover member 52 of this embodiment is provided with positioning holes 52e to prevent the cover member from being attached to the spine member 14 upside down or at a wrong position. The positioning holes 52e are respectively provided in Y-direction end portions of the attachment portion 52c and are respectively spaced apart from the attachment holes 59 by different distances. On the front side 14a of the proximal post member 35, positioning pins 35b are projected at positions corresponding to the positioning holes 52e (see FIG. 5). Inserting the positioning pins 35b into the positioning holes 52e of the attachment portion 52c prevents the cover member 52 from being attached upside down or at a wrong position. The positioning holes 52e and the positioning pins 35b are particularly important for the cushion portion 52b to be placed at a right position so that the front side of the cushion material 58 is protected by the protection sheet 57 as described later. In a similar manner, a pair of positioning holes 60b is provided in the retaining member 60, and a pair of positioning pins 34b to be inserted into the positioning holes 60b is provided on the front side 14a of the distal post member 34.

Motions and effects of the cover member 52 during the rotation of the chassis 12A and 12B are now described.

In the flat form illustrated in FIG. 4A, the distal post member 34, the post members 36a to 36d, and the proximal post member 35 of the spine member 14 are arranged planarly along the X direction across the adjacent end portions 12Aa and 12Ba of the chassis 12A and 12B that are in contact with each other. Here, the distal post member 34 of the spine member 14 has been slid to a position farthest to the first chassis 12A side. Substantially V-shaped gaps have been respectively formed between the opposing side surfaces 34a and 40a, 40b and 40a, and 40b and 35a.

The attachment portion 52c of the cover member 52 is fixed to the proximal post member 35 and extends in the X direction on the front side 14a of the spine member 14 to the first chassis 12A side. A distal tip of the distal sheet portion 52a of the cover member 52 is inserted into the opening 60a provided at the distal post member 34.

Rotations of the first and second chassis 12A and 12B from the flat form into the stacked form are now described. As mentioned above, in the portable information device 10, the rotation center of the chassis 12A and 12B defined by the hinges 17 coincides with the front side 16a of the display 16. When the chassis 12A and 12B are folded from the flat form into the stacked form, the cover member 52 is therefore located on an outer side than the rotation center, and the spine member 14 is located on a further outer side than the cover member 52.

As the spine member 14 is located on the outer side than the rotation center, it receives a tensile force in the X direction during the rotation. The proximal post member 35, which is fixed to the second chassis 12B, then pulls the distal post member 34 toward the second chassis 12B side, so that the spine member 14 is slid over the inner surface 12Ab of the first chassis 12A. Likewise, the cover member 52 also receives a tensile force in the X direction during the rotation because it is located on the outer side than the rotation center. The attachment portion 52c, which is fixed to the second chassis 12B, then pulls the distal sheet portion 52a toward the second chassis 12B side, so that the cover member 52 is slid over the front side 14a of the spine member 14.

In the stacked form illustrated in FIG. 4B, the now curved spine member 14 cover and hide the big gap generated between the adjacent end portions 12Aa and 12Ba of the chassis 12A and 12B from an inside. The opposing side surfaces 34a and 40a, 40b and 40a, 40b and 35a of the spine member 14 are then in contact with each other to serve together as a highly-rigid post in which the distal post member 34, the post members 36a to 36d, and the proximal post member 35 are continued to form a curve like a backbone. The spine member 14 then functions as a post that reinforces the gap between the separated chassis 12A and 12B. When an external force is applied to the portable information device 10 in a direction of crushing the gap between the stacked chassis 12A and 12B, the spine member 14 stuck between the chassis 12A and 12B prevents the bending region R of the display 16 from being crushed.

Meanwhile, in the flat form, the adjacent end surfaces 24Aa and 24Ba must be in contact with each other without any gap so that the plates 24A and 24B form a stepless flat surface to support the display 16. The adjacent end surfaces 24Aa and 24Ba are therefore formed as sharp edges and, in the stacked form, protrude toward the front side 14a of the spine member 14 (see FIG. 4B). If the portable information device 10 is subjected to a shock such as dropping in the stacked form, these adjacent end surfaces 24Aa and 24Ba may violently contact the hard front side 14a of the spine member 14 and be chipped, cracked or damaged in other ways. In this embodiment, the edges are particularly easily chipped by impact because the plates 24A and 24B are formed of a fiber-reinforced resin plate.

To address this issue, the cover member 52 of this embodiment curves along the front side 14a of the spine member 14 in the stacked form so that the cushion portion 52b (cushion material 58) faces the adjacent end surfaces 24Aa and 24Ba of the plates 24A and 24B (see FIG. 4B). The cushion 52b then absorbs the shock, which prevents the edges of the adjacent end surfaces 24Aa and 24Ba from being damaged despite the interference between the adjacent end surfaces 24Aa and 24Ba and the cover member 52.

In this embodiment, the cover member 52 is disposed to overlap only the groove 46. However, since the cover member 52 is positioned closer to the adjacent end surfaces 24A and 24Ba than the front side 14a of the spine member 14 by a thickness of the cushion portion 52b, when the portable information device 10 is subjected to a shock in the stacked form, the adjacent end surfaces 24Aa and 24Ba come in touch with the cushion portion 52b first and are thus prevented from interfering with the hard front side 14a. It should also be noted that, in the cushion portion 52b of the cover member 52, the front side of the cushion material 58 is provided with the protection sheet 57 that is formed of PET, for example, and is more resistant to scratch or curling up than the front side sheet 54. That means, without the protection sheet 57, the cushion portion includes only the front side sheet 54 and the cushion material 58 and thus the front side would be so soft that the edges of the plates 24A and 24B may catch the front side sheet 54 and the cushion material 58 to end up damaging one another. To address this issue, the cushion portion 52b of this embodiment includes the protection sheet 57 to provide a hard front side. This prevents the front side sheet 54 and the cushion material 58 from being caught by the edges of the plates 24A and 24B when they slide on the front side and thus from damaging one another. Note also that the relief groove 48 provided on the front side 14a of the spine member 14 allows the interference between the locking claws 26A and 26B and the front side 14a to be avoided.

In this embodiment, it is preferable that the cover member 52 is provided because it plays an important role to prevent the lifting of the cable 50 passing through the spine member 14 in the X direction. The cushion portion 52b, however, may be provided elsewhere than on the cover member 52. That is, the cushion portion 52b may be directly stuck onto the front side 14a of the spine member 14, for example. The cushion portion 52b would then still prevent the cushion material 58 from being damaged as long as the protection sheet 57 is provided on the front side of the cushion material 58. Note that providing the cushion portion 52b integrally with the cover member 52 can reduce the number of components and manufacturing processes. The cover member 52 may be provided not to restrain the cable 50 but only to dispose the cushion portion 52b thereon. Providing the cover member 52 makes it easy to dispose the cushion portion 52b. As the cover member 52 is slid in accordance with the movement of the spine member 14, the cushion portion 52b can smoothly follow the movement of the spine member 14.

The cover member 52 of this embodiment is partially provided with the cushion portion 52b including the cushion material 58 formed of polyurethane or the like which is opaque and makes the cable 50 therebehind invisible. On the other hand, the three sheets 54 to 56 laminated to form the distal sheet portion 52a are all transparent or translucent. The cable 50 behind the distal sheet portion 52a can therefore be easily viewed therethrough, which contributes to prevention of an erroneous assembly in manufacturing, for example. Note that the cushion material 58 may also be transparent or translucent. In addition, the attachment portion 52c may be omitted to allow the cable 50 behind the entire cover member 52 to be viewed.

The present invention is not limited to the foregoing embodiment, and modifications can be freely made without departing from the scope of the present invention.

In the description above, the display 16 has been exemplarily shown as a flexible display having the bending region R. However, it is also possible that the top surfaces of the chassis 12A and 12B are respectively provided with displays (dual displays). In that case, the plates 24A and 24B are no longer necessary. Providing the cushion portion 52b at a position facing the end surface of each display in the stacked form prevents the end surface of each display from being damaged. It should also be noted that, in a case where the display 16 is a flexible display, the plates 24A and 24B may not always be necessary depending on specification of the portable information device 10. Providing the cushion portion 52b in such a portable information device 10 would prevent the motherboard 18 from being damaged due to an interference between an end surface of the motherboard 18 and the spine member 14.

Description has been made in the above of the portable information device 10 that is foldable into a double-folded state like a folio. Note that the portable information device of the present invention may be configured not only with two chassis of the same shape connected to each other in a foldable manner, but also with: a larger chassis and two smaller chassis foldably coupled to the left and right edge portions of the larger chassis like double doors; one chassis to each of left and right sides thereof a chassis is coupled, wherein the left and right chassis have different folding directions so that the three chassis form an S-shape; a larger chassis and a smaller chassis foldably connected to either one of left and right edge portions of the larger chassis to form a J-shape, for example. Four or more chassis may be coupled to each other.

The invention claimed is:

1. A portable information device comprising:
   a first chassis;
   a second chassis adjacent to the first chassis, the second chassis being coupled to the first chassis so as to be relatively rotatable between a flat form in which the first and second chassis are arranged side by side in a direction perpendicular to a surface direction thereof and a stacked form in which the first and the second chassis are stacked to overlap each other in the surface direction thereof;
   a spine member is across adjacent end portions of the first and second chassis, the spine member covering a gap generated between the adjacent end portions of the first and second chassis in the stacked form;
   a cushion portion in at least a part of a front side of the spine member, the cushion portion facing an internal space generated between the first and second chassis in the stacked form;
   a cover member that at least partially covers a front side of the spine member,
   wherein the cushion portion is in a part of the cover member;
   on the front side of the spine member, a groove extends along an arrangement direction of the first and second chassis, the groove is a passage for a cable extending across the first and second chassis,
   the cover member covers the groove;
   wherein the cushion portion of the cover member comprises:
   a front side sheet forming a front side of the cover member;
   a back side sheet forming a back side of the cover member;
   a protection sheet laminated on a back side of the front side sheet;
   a cushion material laminated on a back side of the protection sheet; and
   a base sheet laminated between a back side of the cushion material and a front side of the back side sheet.

2. The portable information device according to claim 1, wherein the spine member is movable relative to the first chassis along the arrangement direction of the first and second chassis, and is immovable relative to the second chassis, a first end portion on the first chassis side of the cover member is moveable relative to the spine member, and a second end portion on the second chassis side of the cover member is immovable relative to the spine member, the cover member comprises a distal sheet portion in a predetermined area thereof on the first end portion side, the distal sheet portion being made thinner than the cushion portion, and the front side of the spine member has an opening penetrating in the arrangement direction, the distal sheet portion being slidably inserted into the opening along the arrangement direction.

3. The portable information device according to claim 1, wherein the cover member comprises a transparent portion or a translucent portion at least in a part thereof.

4. The portable information device according to claim 1, further comprising:
a display extending across the first and second chassis and including a bending region at least in an area across the adjacent end portions;
a first plate on an inner surface of the first chassis, the first plate supporting an area of the display on the first chassis side; and
a second plate on an inner surface of the second chassis and adjacent to the first plate, the second plate supporting an area of the display on the second chassis side,
wherein the cushion portion faces end surfaces of the first and second plates in the stacked form.

5. The portable information device according to claim 4, wherein each of the first and second plates is a fiber-reinforced resin plate produced by impregnating reinforced fibers in a matrix resin.

6. A portable information device comprising:
a first chassis;
a second chassis adjacent to the first chassis, the second chassis being coupled to the first chassis so as to be relatively rotatable between a flat form in which the first and second chassis are arranged side by side in a direction perpendicular to a surface direction thereof and a stacked form in which the first and the second chassis are stacked to overlap each other in the surface direction thereof;
a spine member is across adjacent end portions of the first and second chassis, the spine member covering a gap generated between the adjacent end portions of the first and second chassis in the stacked form;
a cushion portion in at least a part of a front side of the spine member, the cushion portion facing an internal space generated between the first and second chassis in the stacked form;
a cover member that at least partially covers a front side of the spine member,
wherein the cushion portion is in a part of the cover member;
the spine member is movable relative to the first chassis along an arrangement direction of the first and second chassis, and is immovable relative to the second chassis,
a first end portion on the first chassis side of the cover member is moveable relative to the spine member, and a second end portion on the second chassis side of the cover member is immovable relative to the spine member,
the cover member comprises a distal sheet portion in a predetermined area thereof on the first end portion side, the distal sheet portion being made thinner than the cushion portion, and
the front side of the spine member has an opening penetrating in the arrangement direction, the distal sheet portion being slidably inserted into the opening along the arrangement direction.

7. The portable information device according to claim 6, wherein,
on the front side of the spine member, a groove extends along the arrangement direction of the first and second chassis, the groove is a passage for a cable extending across the first and second chassis, and
the cover member covers the groove.

8. The portable information device according to claim 6, wherein the cushion portion of the cover member comprises:
a front side sheet forming a front side of the cover member;
a back side sheet forming a back side of the cover member;
a protection sheet laminated on a back side of the front side sheet;
a cushion material laminated on a back side of the protection sheet; and
a base sheet laminated between a back side of the cushion material and a front side of the back side sheet.

9. The portable information device according to claim 8, wherein
the cushion material is formed of sponge or rubber, and
the cushion material has a maximum thickness among the front side sheet, the back side sheet, the protection sheet, the base sheet, and the cushion material.

* * * * *